United States Patent
Humet Pous et al.

(10) Patent No.: US 9,375,963 B2
(45) Date of Patent: Jun. 28, 2016

(54) PRINTER CALIBRATION

(71) Applicant: Hewlett-Packard Development Company, L.P., Houston, TX (US)

(72) Inventors: Jacint Humet Pous, Santa Perpetua de Mogoda (ES); Juan Uroz Soria, Terrassa (ES); Pere Gasparin Talarn, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/780,836

(22) PCT Filed: Mar. 28, 2013

(86) PCT No.: PCT/EP2013/056805
§ 371 (c)(1),
(2) Date: Sep. 28, 2015

(87) PCT Pub. No.: WO2014/154302
PCT Pub. Date: Oct. 2, 2014

(65) Prior Publication Data
US 2016/0052318 A1      Feb. 25, 2016

(51) Int. Cl.
*B41J 29/393* (2006.01)
*B41J 2/205* (2006.01)
(Continued)

(52) U.S. Cl.
CPC *B41J 29/393* (2013.01); *B41J 2/01* (2013.01); *H04N 1/6033* (2013.01)

(58) Field of Classification Search
CPC ........ B41J 2/01; B41J 29/393; G06N 99/005; G03G 15/5062; H04N 1/6033; H04N 1/6036; H04N 1/6038; H04N 1/6044; H04N 1/6047; H04N 1/6055

USPC ......... 347/5, 15, 19; 358/3.27, 504, 518, 519, 358/522, 523; 399/15, 27, 28, 39, 49, 59, 399/61
See application file for complete search history.

(56) References Cited

U.S. PATENT DOCUMENTS 5,305,119 A * 4/1994 Rolleston ............. H04N 1/6033
                                                                358/522
6,030,066 A    2/2000 Li et al.
(Continued)

FOREIGN PATENT DOCUMENTS

EP          1310376         5/2003

OTHER PUBLICATIONS

Huang, et al. "Cascade-CMAC neural network applications on the color scanner to printer calibration." Neural Networks, 1997., International Conference on. vol. 1. IEEE, 1997.
(Continued)

*Primary Examiner* — Anh T. N. Vo
(74) *Attorney, Agent, or Firm* — HP Inc. Patent Department (57) ABSTRACT

Techniques related to printer calibration are disclosed herein. In an example, an actual measurement of a colorimetric parameter is performed by measuring the colorimetric parameter on a printed calibration pattern. The colorimetric parameter is associated with an ink drop number. The calibration pattern is printed with selected printing conditions. An ink drop number variation is determined from a reference measurement and the actual measurement of the colorimetric parameter. The reference measurement is a measurement of a colorimetric parameter. The reference measurement corresponds to a measurement of the colorimetric parameter on a calibration pattern printed with the selected printing conditions. An actual linearization is generated by validating a set of pre-defined linearizations with the determined ink drop number variation. Other examples of printer calibration are disclosed.

15 Claims, 5 Drawing Sheets

(51) Int. Cl.
*H04N 1/46* (2006.01)
*H04N 1/60* (2006.01)
*B41J 2/01* (2006.01)

(56) References Cited

U.S. PATENT DOCUMENTS

| | | | |
|---|---|---|---|
| 6,381,037 B1 * | 4/2002 | Balasubramanian | H04N 1/6033 |
| | | | 358/3.23 |
| 6,431,679 B1 | 8/2002 | Li et al. | |
| 6,624,876 B2 * | 9/2003 | Fukuda | G03B 27/73 |
| | | | 355/29 |
| 6,851,785 B2 | 2/2005 | Wu et al. | |
| 7,019,867 B2 | 3/2006 | Kuwata et al. | |
| 7,193,640 B2 * | 3/2007 | Egan | H04N 1/506 |
| | | | 347/171 |
| 7,206,068 B2 * | 4/2007 | Suzuki | G03G 15/5062 |
| | | | 356/244 |
| 7,286,261 B2 * | 10/2007 | Gudaitis | H04N 1/6033 |
| | | | 347/19 |
| 7,505,622 B2 | 3/2009 | Ono | |
| 7,551,315 B2 | 6/2009 | Hoshii et al. | |
| 2011/0063633 A1 | 3/2011 | Ernst et al. | |

OTHER PUBLICATIONS

PCT Search Report, Jan. 8, 2014, International Patent Application No. PCT/EP2013/056805, European Patent Office.

* cited by examiner

PRINTER CALIBRATION

CROSS-REFERENCE TO RELATED APPLICATION

This application is a U.S. National Stage Application of and claims priority to International Patent Application No. PCT/EP2013/056805, filed on Mar. 28, 2013, and entitled "PRINTER CALIBRATION," which is hereby incorporated by reference in its entirety.

BACKGROUND

Calibration of a printer aims to maintain reasonably consistent and predictable color appearance in printed images. Via properly printer calibration, a relatively good color matching between color in an image to be printed and the printed result can be achieved.

Printers are characterized by multiple ink channels. For example, a CMYK printer may have a cyan channel, a magenta channel, a yellow channel and a black channel. Generally, in a printer, the color output of each ink channel is non-linear. In other words, the perceived color intensity output for each ink channel may not linearly increase with the amount of deposited ink.

Therefore, printer calibration may include using a linearization of the printer. In printer linearization a compensation curve is used for each ink channel of the printer to make the color output for each channel to appear, at least approximately, linear. For printer linearization, a linearization table may be used relating a required color appearance with an amount of ink to be deposited.

BRIEF DESCRIPTION OF THE DRAWINGS

In order that the present disclosure may be well understood, various examples will now be described with reference to the following drawings.

DETAILED DESCRIPTION

In the following description, numerous details are set forth to provide an understanding of the examples disclosed herein. However, it will be understood that the examples may be practiced without these details. While a limited number of examples have been disclosed, it should be understood that there are numerous modifications and variations therefrom. Similar or equal elements in the Figures may be indicated using the same numeral.

As set forth above, printer calibration may include linearization of the printer. Printer linearization may involve printing a set of patches and measuring the output color for each ink channel of the ink. From the measurement, a linearization curve may be built that aims to linearize the relationship between the input for ejecting ink and the resulting printed color intensity.

The ratio output color intensity versus amount of deposited ink may vary over time. More specifically, over printer lifetime, the color output of a printer may vary. For example, drop size outputted by a printhead may vary over time. In thermal inkjet printers, drop size may reduce up to 30% along the life of the print head. This variation may be due to deposition of solids on the resistors of the nozzles, which reduces the performance of the nozzle as well as the volume of the associated ejection chamber. Further, ink settling over time may produce changes in the pigment or dye concentrations and cause also color variations due to drop weight changes.

Therefore, it might be advantageous to re-linearize a printer (i.e., to generate an actual linearization curve) for compensating for variations in the printing performance of the printer.

However, techniques for printer re-linearization may be time consuming and costly. For example, using a conventional linearization technique, a significant number of printer test patches are printed for each ink channel being calibrated in the printhead. For a four color printer (e.g., a CMYK printer), producing a test ramp may include at least 17 patches for each ink having an increment in gray level of 16 units between each of the gradients. This might require printing a total of 68 patches.

For printer having a greater number of ink channels, an even longer time period and additional printing costs may be involved as significantly more patches must be printed. For example, a six-color printer (i.e., CcMmYK) may involve printing 17 patches for each of the 6 colors for a total of 102 patches.

Even when the patches are printed, an additional time delay is incurred as they are scanned and processed. An embedded sensor built into the printer takes time to scan the patches and detect the optical density of the ink printed. For example, a printer linearization may require optically measuring the printed patches for building the linearization. If the printer is able to conduct the print medium forward and then in reverse, the different patches are printed and then reversed for measurement by the embedded sensor on the printer. However, if the printer does not have a paper reverse feature, each portion of the test patch may be printed swath by swath and then allowed to dry prior to taking sensor measurements. This can take a non-negligible time as a four-color printhead may involve printing 17 patches for 4 different colors, or a total of 68 patches.

In view of the foregoing, printer users may refrain from re-linearizing a printer as the time delay for printing, sensing, and processing the numerous patches is significant. Accordingly, these printers may not be properly calibrated and may produce inconsistent colors and less than optimal print results.

It has also been elsewhere proposed to perform linearization based on interpolating prebuilt linearization tables to create an actual linearization table to accelerate linearization. In such proposed linearizations, the interpolated prebuilt linearization tables are selected based on a comparison of actual optical density measurements with optical density measurements for the different printheads used to build the prebuilt linearization tables. Such interpolation, however, may not compensate color variations caused by drop weight changes in a fast and simple way.

In order to facilitate a fast and simple calibration of a printer that strive compensating color variations caused by drop weight changes over printer operating life, in some examples herein, an initial reference measurement of a colorimetric parameter associated with an ink drop number is used for linearizing a printer. More specifically, in an example, a calibration pattern containing one or more patches for each ink and substrate may be printed. Each of the patches is printed using selected print conditions, e.g., a selected ink drop number. A selected ink drop number may be in the form of a print parameter that determines the number of ink drops to be ejected by a printhead for depositing ink on a location. For example, a printhead unit for ejecting an ink may be operated with a digital input that determines the number of ink drops to be deposited in a specific substrate location. Such a digital input may be, for example, an eight or twelve bits digital input to a printhead.

Once the one or more patches are printed, a colorimetric parameter thereof may be measured with an embedded optical sensor (e.g., a spectrophotometer or a densitometer). A colorimetric parameter is associated with the number of ink drops used to print the respective patches. Thereby, an initial characterization of the system may be obtained. The initial reference measurement may be stored and used as color references for future calibrations and, more specifically, for modifying pre-built linearizations as described below.

As used herein, a colorimetric parameter refers to a measurable parameter associated with color. A measurement of the colorimetric parameter on a printed patch is affected by the amount of ink used to print the patch. The amount of used ink depends on, among others, (1) the number of ink drops deposited in a specific substrate location; and (2) the drop weight. As set forth above, the drop weight may vary over the operational time of the printhead. In examples herein, the ink drop number is associated to the colorimetric parameter, since this is a print parameter that can be straightforwardly determined, e.g., using the printhead input that determines how many ink drops are to be deposited by a printhead unit on a substrate location.

Examples of colorimetric parameters include lightness (e.g., L* in the Lab Space), other Lab space coordinates such as the a*, b* coordinates, Chroma values, optical density, or any other measurable magnitude determined by the printed color. The a*, b* coordinates, or Chroma values are measurable by a spectrophotometer. Optical density is measurable by a densitometer. Other colorimetric parameters and optical sensors may be used to implement examples herein.

For calibrating the printer, the initial reference measurement may be addressed. An actual measurement of the colorimetric parameter may be obtained by operating the printer to print a calibration pattern with the selected printing conditions (e.g., the same printing conditions used to print the calibration pattern from which the initial reference measurement was obtained). The printing conditions may be the same number of ink drops for each patch of the calibration pattern.

An ink drop number variation from the reference measurement and the actual measurement of the colorimetric parameter may be obtained. For example, the ink drop number variation may be a drop number ratio. It will be understood that the ink drop number variation may be obtained using other parameters that are based on a comparison between the reference measurement and the current measurement. From the ink drop number variation, compensation data for the printing system may be obtained. The compensation data aims to reproduce the first calibration pattern by varying the number of ink drops for printing each patch. In some examples, compensation data may be obtained by estimating an actual linearization that is a modification of pre-built linearizations. More specifically, the pre-built linearizations are modified using reference and actual measurements of a colorimetric parameter. Such an actual linearization may be estimated by comparing a set of pre-defined linearizations with the determined ink drop number variation as set forth in the examples illustrated below. However, compensation may be implemented by other methods. For example, as set forth below, the ink drop number variation can be used as a compensation factor to determining ink drop number to be deposited for achieving a specific color output.

The following description is broken into sections. The first, labeled "Environment," describes environments in which examples may be implemented. The second section, labeled "Components," describes various physical and logical components for implementing various examples. The third section, labeled as "Operation," describes steps taken to implement various embodiments.

Figure 1:
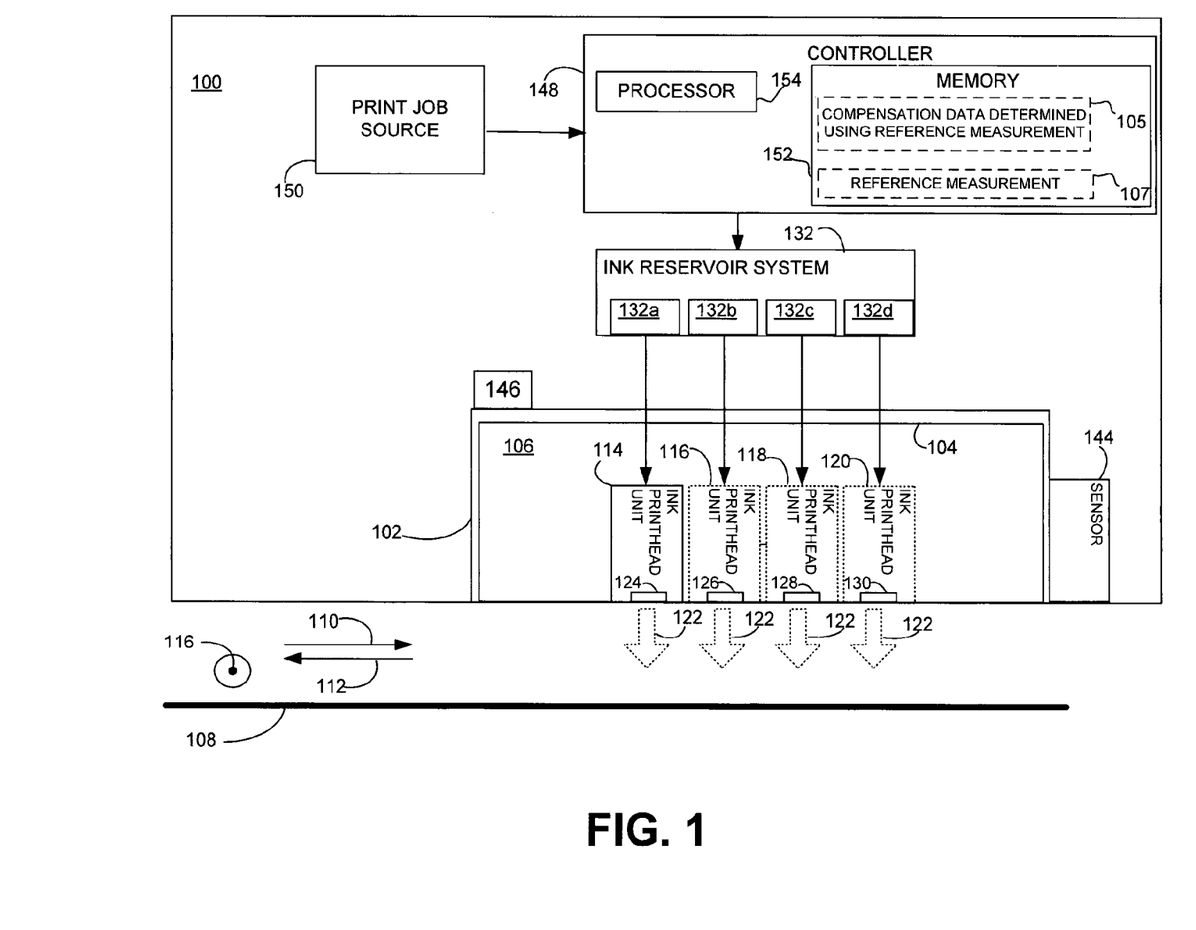
FIG. 1 is a block diagram schematically illustrating a printing system in which examples can be implemented.

Environment:

FIG. 1 is a block diagram of a printer 100, in which examples can be implemented. It will be understood that the following description of printer 100 is merely illustrative and does not limit the components and functionality of examples described in the present disclosure.

As shown in the diagram, printer 100 includes a carriage 102 with a printhead receiving assembly 104. In the illustrated example, printer 100 is illustrated including printhead 106 in printhead receiving assembly 104. Carriage 102 is to transition printhead 106 across the width of a substrate 108, i.e., along printhead transition directions 110, 112. For example a drive 146 may be coupled to carriage 102 for effecting carriage transition. Thereby, printer 100 can perform printing across a width of substrate 108 via translation of carriage 102. In other examples, printhead 106 is a page-wide array printhead and translation is not required for printing across a width of substrate 108.

Printhead 106 in this example is illustrated to include a plurality of ink printhead units 114, 116, 118, 120. Each of the ink printhead units is configured to eject ink 122 of a different color via respective ink nozzle array arrangement 124, 126, 128, 130. Ink printhead units 114, 116, 118, 120 are fluidly connected to an ink reservoir system 132. Ink reservoir system 132 includes ink reservoirs 132a, 132b, 132c, 132d for providing ink to the respective ink printhead units. In the illustrated example, ink reservoirs 132a, 132b, 132c, 132d respectively store cyan ink, magenta ink, yellow ink, and black ink. Base colors are reproduced on substrate 108 by depositing a number of ink drops of one of the above mentioned inks onto a substrate location. Further, secondary colors can be reproduced by combining ink from different ink printhead units. In particular, secondary or shaded colors can be reproduced by depositing drops of different base colors on adjacent dot locations in the substrate location (the human eye interprets the color mixing as the secondary color or shading). It will be understood that further ink reservoirs may be provided. For example, a CcMmKY printer may include further ink reservoirs for light cyan (c) and light magenta (m).

The reservoirs may be mounted on carriage 102 in a position adjacent to the respective printhead. In other configurations (also referred to as off-axis systems), the reservoirs are not mounted on carriage 102 and a small fluid supply (ink or treatment) is externally provided to the printhead units in carriage 102; main supplies for ink and fixer are then stored in the respective reservoirs. In an off-axis system, flexible conduits are used to convey the fluid from the off-axis main supplies to the corresponding printhead cartridge. Printheads and reservoirs may be combined into single units, which are commonly referred to as "pens".

Although not shown in FIG. 1, printer 100 may include also further printhead units for ejecting other print fluids on locations of substrate 108. For example printer 100 may be configured to eject a pre-treatment fluid (e.g., a fixer) and/or a post-treatment fluid (e.g., a coating).

It will be appreciated that examples can be realized with any number of printhead units depending on the design of the particular printing system, each printhead unit including a nozzle array for jetting a printing fluid such as ink or treatment. For example, printer 100 may include at least one treatment printhead unit, such as two or more treatment printhead units. Furthermore, printer 100 may include at least one ink printhead unit, such as two to six ink printhead units, or even more ink printhead units.

Printhead units might be monolithically integrated in printhead 106. Alternatively, each printhead unit might be modularly implemented in printhead 106 so that each printhead unit can be individually replaced. Further, printhead 106 may be a disposable printer element or a fixed printer element designed to last for the whole operating life of printer 100.

Printer 100 is shown to include a sensor 144 attached to carriage 102 so that the sensor translates with the carriage. Sensor 144 is to measure a colorimetric parameter associated with an ink drop number such as, but not limited to lightness (e.g., L* in the Lab Space), other Lab space coordinates such as the a*, b* coordinates, Chroma values, or optical density. Sensor 144 can measure values of the colorimetric parameter on substrate locations across the substrate by scanning carriage 102. Sensor 144 may include a spectrophotometer, a densitometer or any other optical sensor for measuring a colorimetric parameter. It will be understood that the configuration of sensor 144 in printer 100 is merely illustrative. Other configurations are foreseen that facilitate measurement of the colorimetric parameter across the substrate.

Printer 100 further includes a controller 148, which is operatively connected to the above described elements of printer 100. Controller 148 is shown configured to execute a print job received from a printjob source 150 according to compensation data 105. Controller 148 is shown to include processor 154. Processor 154 is configured to execute methods as described herein.

Processor 154 may be implemented, for example, by one or more discrete modules (or data processing components) that are not limited to any particular hardware, firmware, or software (i.e., machine readable instructions) configuration. Processor 154 may be implemented in any computing or data processing environment, including in digital electronic circuitry, e.g., an application-specific integrated circuit, such as a digital signal processor (DSP) or in computer hardware, firmware, device driver, or software (i.e., machine readable instructions). In some implementations, the functionalities of the modules are combined into a single data processing component. In other versions, the respective functionalities of each of one or more of the modules are performed by a respective set of multiple data processing components.

Memory 152 is accessible by controller 148 and, more specifically, by processor 154. Memory 152 may be integrated within controller 148 or may be a separate component communicatively connected to controller 148. Memory 152 stores process instructions (e.g., machine-readable code, such as computer software) for implementing methods executed by controller 148 and, more specifically, by processor 154.

Memory 152 is shown to include compensation data 105 to operate printing system 100. Further, memory 152 is shown to include a reference measurement 107 that can be used to determine compensation data 105 as illustrated in examples herein. Memory 152 may also include data to determine compensation data 105 according to the examples set forth below.

Controller 148 receives printjob commands and data from printjob source 150, which may be a computer or any other source of printjobs, in order to print an image. In the example, controller 148 is configured to determine a print mask from the received data. A print mask refers to logic that includes control data determining which nozzles of the different printheads are fired at a given time to eject fluid in order to reproduce a printjob. The print mask may be processed according to compensation data 105 by processor 154 in order to cause ejection of a proper number of ink drops to realize an appropriate color output.

Controller 148 is operatively connected to ink printhead units 114, 116, 118, 120, and the respective reservoirs to control, according to the print mask and the control data in memory 152, printer operation. Thereby, controller 148, and more specifically processor 154, can control functionality of printer 100 such as, but not limited to, printing according to compensation data 105.

It will be understood that the functionality of memory 152 and print job source 150 might be combined in a single element or distributed in multiple elements. Further, memory 152 and print job source 150 may be provided as external elements of print system 100. Further, it will be understood that operation of processor 154 to control treatment ejection is not limited to the above examples.

Compensation data 105 is generated using a reference measurement 107. Reference measurement 107 is a measurement of a colorimetric parameter associated with an ink drop number. The colorimetric parameter value corresponds to a measurement of a calibration pattern comprised of a first set of color patches, each patch being printed by printer 100 using a selected number of ink drops. Details on how compensation data 105 and reference measurement 107 can be generated are set forth below with respect to FIGS. 4 to 9.

Components:

At least some of the functionality described herein can be implemented as components comprised of a combination of hardware and programming configured for performing tasks described herein (for example, blocks in the flow charts illustrated below with respect to FIGS. 4 and 5).

Figure 2:
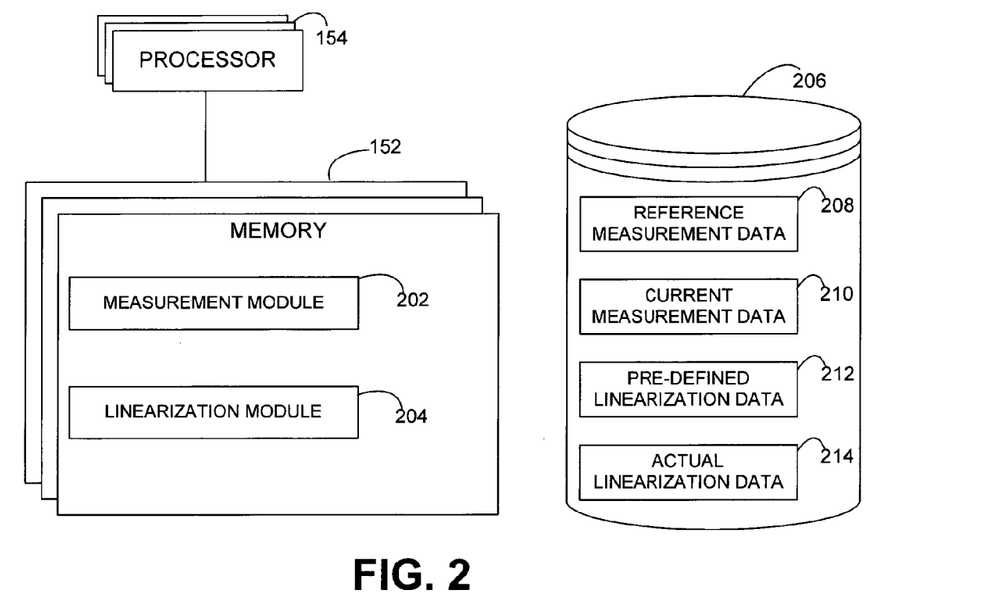
FIG. 2 is a block diagram schematically illustrating components for implementing examples.

FIG. 2 depicts examples of physical and logical components for implementing examples illustrated herein. In illustrating FIG. 2, reference is made to printer 100 in FIG. 1. It will be understood that this reference is merely illustrative and does not limit components of examples herein.

In the example of FIG. 2, the programming may be processor executable instructions stored on a tangible memory media, e.g., memory 152 and the hardware may include processor 154 for executing those instructions. Memory 152 can be said to store program instructions that when executed by processor 154 implements, at least partially, controller 148 shown in FIG. 1. Memory 152 may be integrated in the same device as processor 154 or it may be separate but accessible to that device and processor 154. Memory 152 and processor 154 may be respectively comprised of single, integrated components or may be distributed over a number of discrete memory units and processor units. Such discrete memory units and processor units may be included in the same integrated component (e.g., controller 148) or may be distributed over different, communicatively connected, components (e.g., a controller comprised of multiple discrete components).

Program instructions in memory 152 may be part of an installation package that can be executed by processor 154 to implement examples herein. In this case, memory 152 may be a portable medium such as a CD, DVD, or flash drive or a memory maintained by a server from which the installation package can be downloaded and installed. In another example, the program instructions may be part of an application or applications already installed. Here, memory 152 can include integrated memory such as a hard drive. It should be noted that a tangible medium as used herein is considered not to consist of a propagating signal. In examples, the medium is a non-transitory medium.

In FIG. 2 the executable program instructions stored in memory 152 are depicted as a measurement module 202 and a linearization module 204.

In examples, measurement module 202 is configured to perform measurements of a colorimetric parameter. For example, via measurement module 202, sensor 144 (shown in FIG. 1) may be operated to obtain measurements of the color patches for performing a reference measurement. For this measurement, module 202 may cause any of printhead units 114, 116, 118, 120 to print a first calibration pattern 302 (shown in FIG. 3A) on a substrate 306. First calibration pattern 302 may be comprised of a set of color patches 302a-302e. Each patch is printed using a selected number of ink drops of one of the primary inks available to the printer. Calibration pattern 302 may include similar color patches for the other primary inks available to the printer, i.e. a set of patches printed with selected numbers of drops for cyan, magenta, yellow, or black ink. Further set of patches may be printed in case the printer provides further color channels (e.g., light magenta and light cyan).

Figure 3A:
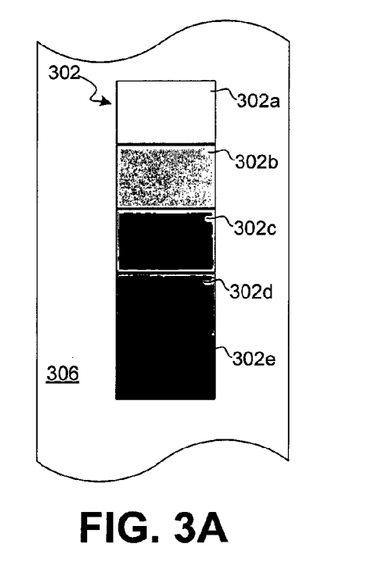
FIGS. 3A and 3B schematically illustrate calibration patterns according to examples.

In the illustrated example, the set of patches includes five patches, each patch printed with a different number of ink drops. The number of patches may be varied to meet different accuracy requirements for the generation of compensation data. The set of patches may include one or more patches for establishing a reference measurement and one or more patches for performing current measurements. In an example, the number of patches is only one for the reference but at least two to perform the calibration.

Module 202 may also cause registering sensor 144 with respect to each of patches 302a-302e so that a reference value (e.g., a L*, an a*, a b*, an optical density, or a Chroma value) can be measured for each color patch. Thereby, the reference measurement is comprised of a plurality of reference values. The obtained measurement can be stored in a data store 206 as part of reference measurement data 208. Data store 206 represents, generally, any memory capable of storing data that can be accessed by form fill device in the performance of its functions.

In addition to performing a reference measurement, via measurement module 202, sensor 144 may be operated to obtain measurements of an actual value of the colorimetric parameter. For performing this measurement, module 202 may cause printer 100 to print a second calibration pattern 304 (shown in FIG. 3B) on a substrate 310. Substrates 306 and 308 may be of the same substrate type, which might facilitate consistency of the linearization process. In other examples, the substrates may be of different types. In such examples, differences between the substrates may be taken into account in the linearization process.

Figure 3B:
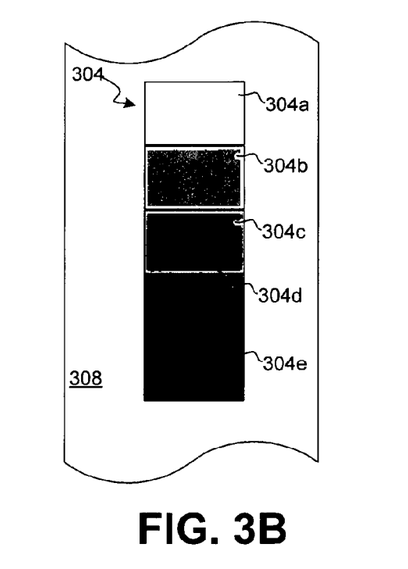

Second calibration pattern 304 may be comprised of the set of color patches used to print pattern 302. That is, each patch in second calibration pattern 304 may be printed using the same printing conditions as used for obtaining the reference measurement, e.g., the selected number of ink drops used for printing first calibration pattern 302. However, operational variations in printer 100 from the time at which the reference measurement was performed may cause changes in the ink amount to be deposited. For example, drop weight of ink drops ejected by printhead 106 may vary during the operating life elapsed from printing first calibration pattern 302. Consequently, second calibration pattern 304 may be comprised of patches 304a-304e that result on different values of the colorimetric parameter as compared to the reference measurement performed on patches 302a-302e. For example, due to a reduced drop weight over time, calibration pattern 304 may result on higher L* values as compared to calibration pattern 302, as in the example of FIG. 6. (It should be taken into account that lightness L* is, generally, inversely proportional to the amount of deposited ink since the substrate is generally characterized by high L* values that decreases as ink is deposited thereon.)

Then, module 202 may cause registering sensor 144 with respect to each of patches 304a-304e in the second calibration pattern 304, so that a reference value can be measured for each color patch. Thereby, the actual measurement is comprised of a plurality of actual values. The thereby obtained reference measurement can be stored in data store 206 as part of actual measurement data 210.

Referring now to linearization module 204, in examples, it is configured to generate an actual linearization of the printer. As used herein, an actual printer linearization refers to a printer linearization that takes into account operational changes in printer 100 that cause changes in the color output (e.g., a change in drop weight). An actual printer linearization can be seen as an example of compensation data 105. There are a number of options for generating the actual linearization, as illustrated below with respect to FIGS. 4 and 5.

In a specific example, linearization module 204 is configured to determine a drop number ratio from the actual measurement and the reference measurement by accessing, respectively, reference measurement data 208 and current measurement data 210 stored in data store 206. Further, linearization module 204 may be configured to select two pre-defined linearizations using the determined drop number ratio, as illustrated in more detail below with respect to FIGS. 6 to 9. For performing this task, linearization module 204 may access pre-defined linearization data 212 stored in data store 206. Pre-defined linearization data 212 may be in the form of look-up tables, each look-up table corresponding to a pre-defined linearization for compensating ink ejection assuming a specific drop weight, as illustrated below with respect to FIGS. 7A and 7B.

Further, linearization module 204 may also be configured to generate an actual linearization of the printer by interpolating two pre-defined linearizations using the determined drop number ratio. Based on the generated actual linearization, linearization module 204 may store actual linearization data 214 in data store 206. Linearization data 214 may be in the form of a look-up table to be applied by printer 100 as compensation data 105 so as to facilitate linearization in its color output.

Figure 4:
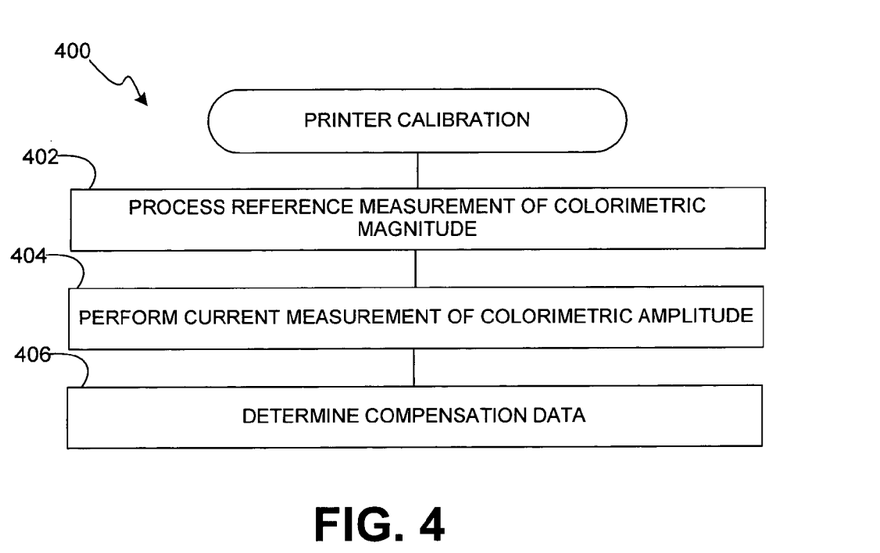
FIG. 4 is a flow chart that implements examples of methods for printer calibration.
Figure 5:
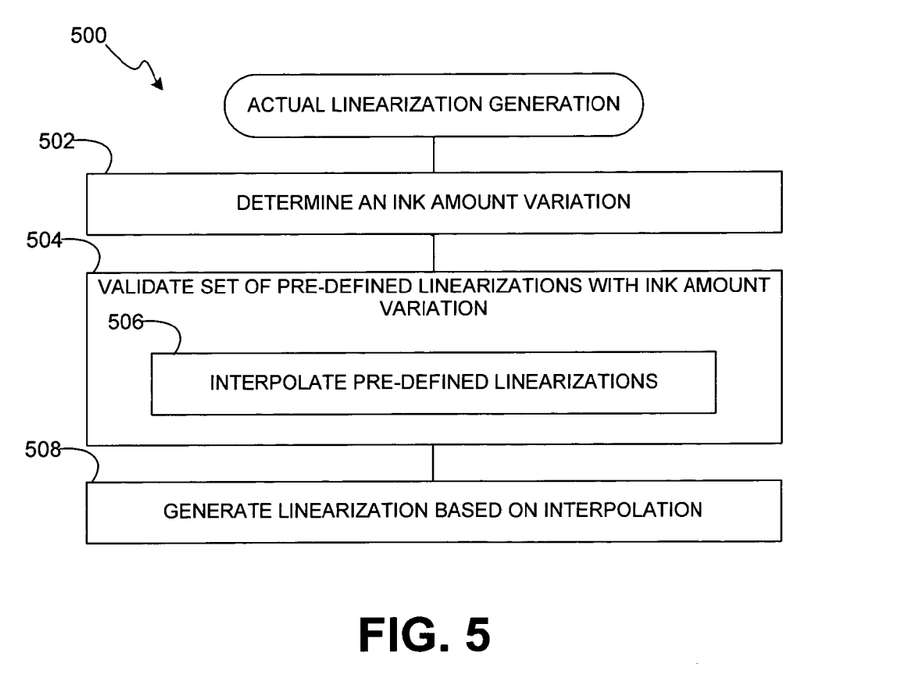
FIG. 5 is a flow chart illustrating examples for determining compensation data in the form of an actual linearization of a printer.

Operations:

FIGS. 4 and 5 show flow charts illustrating examples for implementing calibration of printers. In discussing FIGS. 4 and 5, reference is made to FIGS. 1 to 3B to provide contextual examples. Implementation, however, is not limited to those examples. Reference is also made to the example forms depicted in FIGS. 6 to 9. Again, such references are made simply to provide contextual examples.

FIG. 4 shows a flow chart 400 that implements examples of methods for printer calibration. The printer is for printing an image by deposition of an ink on a substrate. Printer 100, illustrated above with respect to FIG. 1, is an example of such a printer. Blocks in flow chart 400 may be executed by controller 148, shown in FIG. 1, or the components illustrated with respect to FIG. 2.

At block 402, a reference measurement of a colorimetric magnitude is processed. The colorimetric parameter associated with an ink drop number (e.g., one of L*, a*, b*, Chroma, optical density, or a combination thereof). As illustrated above with respect to FIGS. 2 and 3A, the reference measurement may correspond to a measurement of the colorimetric parameter on calibration pattern 302 printed by operating printer 100 with selected printing conditions. The selected print condition may include a number of ink drops of a selected color (e.g., cyan, magenta, yellow, or black) printable by the printer to print a color patch (e.g., any of color patches 302a-302e) of calibration pattern 302.

At block 404, an actual measurement of the colorimetric parameter is performed. As illustrated above with respect to FIGS. 2 and 3B, printer 100 may be operated to print calibration pattern 304 with the selected printing conditions used to print calibration pattern 302. Sensor 144 may be then used to measurement the colorimetric parameter on calibration pattern 304. Thereby, color patches 304a-304e may be printed using the same number of ink drops used to print the reference measurement.

At block 406, compensation data is determined using the reference measurement and the actual measurement. The compensation data is determined to reproduce the first calibration pattern. In other words, the compensation data aims to preserve the color output of printer 100 at the time the reference measurement was performed. The compensation data indicate printer 100 the number of ink drops to be deposited in order to achieve a desired color output. As set forth above, the compensation data may be embodied by a current linearization table to be stored and applied by printer 100. Other types of compensations are foreseen. For example, compensation may be a constant factor to be applied to the number of drops to be deposited, the constant factor being based on the drop number ratio or the drop weight ratio described herein.

FIG. 5 illustrates examples for determining compensation data in the form of an actual linearization of a printer. It will be understood that the example of FIG. 5 is not limiting and that there are a variety of manners for determining compensation data and, more specifically, a linearization of printer 100 according to the principles herein.

FIG. 5 shows a flowchart 500 for generating an actual linearization of printer 100. The example of flowchart 500 is based on validating a set of pre-defined linearizations with an ink drop number variation determined from a reference measurement and an actual measurement of the colorimetric parameter. Blocks in flow chart 500 may be executed by controller 148, shown in FIG. 1, or the components illustrated with respect to FIG. 2.

At block 502, an ink drop number variation is determined from the reference measurement and the actual measurement of the colorimetric parameter. There are a variety of options for determining the ink drop number variation. One option is to determine an ink drop number ratio from the reference measurement and the actual measurement and, more specifically, an ink drop number ratio as illustrated in the following with reference to FIG. 6. Other options for determining ink drop number variations may be based on other relationships between the reference measurement and the actual measurement, such as a proportionality factor or using any other parametrized relationship that is suitable for deriving compensation data.

Figure 6:
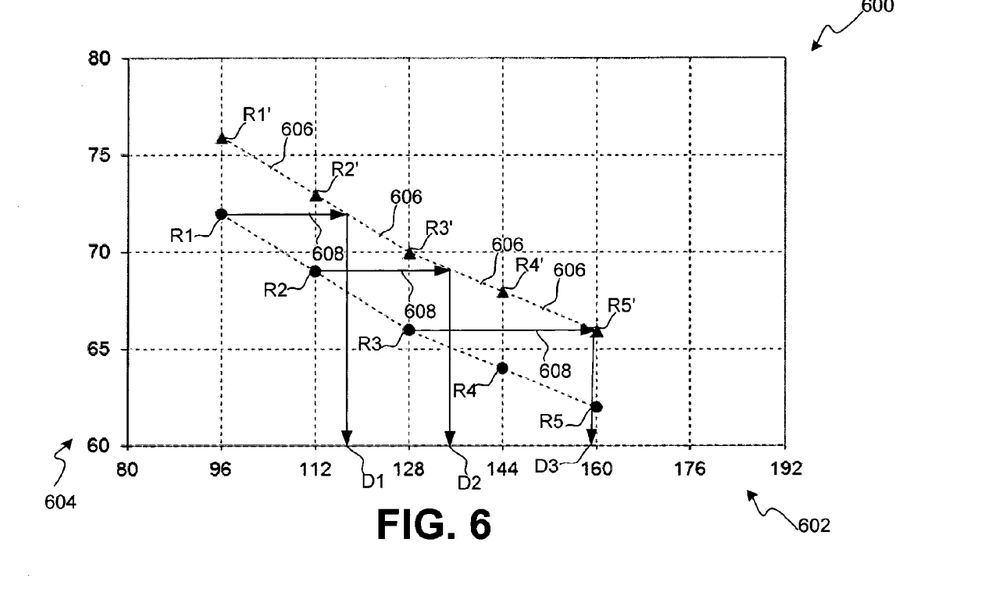
FIG. 6 is a graph illustrating examples of ink drop number variation determination.

FIG. 6 shows an example of how an ink drop number variation may be determined. In this example a reference measurement is comprised of five reference measurement values R1 to R5. Each of the reference measurement values is performed printing a patch using a selected number of ink drops of a primary color of printer 100. These measurements may be obtained via patches 302a to 302e as illustrated above with respect to FIG. 2A. Abscissa axis 602 of graph 600 indicates the number of drops associated with each of reference measurement values R1 to R5. The units of abscissa axis 602 correspond to an eight bit printhead input determining the number of drops to be ejected (i.e., a 256 input corresponds to the maximal number of drops to be deposited on a substrate location). Ordinate 604 of graph 600 indicates the colorimetric value for each of reference measurement values R1 to R5. The units of ordinate axis 604 are arbitrary and correspond to the specific type of used sensor 144 (e.g., a densitometer, a spectrometer or any other suitable optical sensor).

In the example of FIG. 6, each of the actual measurement values R1' to R5' is performed printing a patch using the same printing conditions used for obtaining reference measurement values R1 to R5 and, more specifically, the same number of ink drops and the same primary color. Actual measurement values R1' to R5' may be obtained via patches 304a to 304e as illustrated above with respect to FIG. 3B.

In the example of FIG. 6, for determining the ink drop number variation, a set of drop number ratios are determined. In this example, the drop number ratios are determined by estimating, for each reference measurement, the number of drops D in the actual condition of the printer that produces the same colorimetric magnitude of the reference. As shown, this might be estimated using lines 606 joining the actual measurement values R1' to R5'. The number of drops D in the actual condition is determined using horizontal lines 608 crossing from reference values R1 to R5 to lines 606 that connects in graph 600 actual measurement values R1' to R5'. Thereby, actual drop values D1 to D3 can be determined in abscissa axis 602.

In the illustrated example, three values D1 to D3 of the number of drops in the actual condition as compared to the reference conditions are determined (for references R4 and R5, no values are determined since no corresponding intersection between horizontal lines 608 and connection lines 606 exists). From these drop numbers, a drop number ratio between the reference printer condition and the actual printer condition can be straightforwardly determined as the ratio between the drop number for each of reference measurements R1, R2, and R3 and actual drop values D1 to D3. Therefore, in the illustrated example, the drop number ratio is comprised of three values, each of them associated with a respective reference:

TABLE 1

| REFERENCE | R1 | R2 | R3 | R4 | R5 |
|---|---|---|---|---|---|
| DROP NUMBER RATIO | 1.10 | 1.11 | 1.13 | NA | NA |

It will be understood that there are a variety of approaches for obtaining a drop number ratio. For example, but not limited to, a curve fit based on the actual measurement values R1' to R5' may be used for obtaining the number of drops D in the actual condition of the printer using the intersection with horizontal lines 608. (In such an approach, a drop number ratio can be determined for each reference measurement by extrapolating the curve fit to regions where it intersects all the horizontal lines.)

In some examples, compensation data 105 may be determined directly from the determined drop number ratio. For example, the above drop number ratio values in Table 1 can be used as a compensation factor for determining the number of ink drop to be ejected at different ink drop number regimes. Alternatively, a single compensation factor may be determined based on an average. In the illustrated example, the drop number ratio is used to determine an actual linearization as further illustrated in the following.

Referring back to FIG. 5, at block 504 a set of pre-defined linearizations is validated with an ink drop number variation. The set of pre-defined linearizations may be comprised of linearization tables built under specific printer conditions. For example, the set of pre-defined linearizations may be built based on a) an expected drop weight degradation of the printer, b) a manufacturing tolerance of the printer, c) type of substrate to be used, or d) a combination thereof. For example, each linearization in the pre-defined set may correspond to a specific drop weight as illustrated in the examples below and may be built in consideration of the influence of substrate type on the color output. The set may be built to cover drop weight variations that a printer may be expected to produce over its whole operational life. Thereby, it is facilitated that the set is usable for being validated under expected drop weight variations of a particular printer type.

Further, the pre-defined set of linearizations may be built specifically for a particular substrate type and ink. Using such a set, an actual linearization that meets a color output for the particular type of substrate and ink can be built. In such an actual linearization for a particular substrate type, it is generally advantageous to obtain actual measurements of the colorimetric parameter using the particular type of substrate. However, the actual linearization can also be generated using a pre-defined set of linearizations built specifically for substrate type, since at least some of the examples herein are robust enough for facilitating that such an actual linearization delivers acceptable results.

The pre-defined set of linearizations may be built by performing linearization of different printers. Alternatively, or in addition thereto, pre-defined set of linearizations may be built by simulating printer operating under different conditions (e.g., different drop weights). U.S. Pat. No. 6,851,785 describes pre-defined linearizations and is incorporated herein by reference in its entirety (to the extent in which this document is not inconsistent with the present disclosure) and in particular those parts thereof describing building and making available pre-defined linearizations.

There are a variety of manners of validating a set of pre-defined linearizations. In an example, interpolation is used. More specifically, validation 504 may include at block 506 to interpolate between pre-defined linearizations. This is illustrated in the following referring to FIGS. 7A to 9, which set forth the example of FIG. 6 described above. More specifically, in these Figures, it is illustrated actual linearization estimation by averaging using the plurality of measurement values shown in FIG. 6 for selecting pre-defined linearizations from the set of pre-defined linearizations. Interpolation is then performed from the selected pre-defined linearizations. Further, in the illustrated example, validating the set of pre-defined linearizations with the determined ink drop number variation, i.e., the drop number ratios shown in the table above, includes interpolating two pre-defined linearizations selected based on the determined ink amount variation.

Figure 7A:
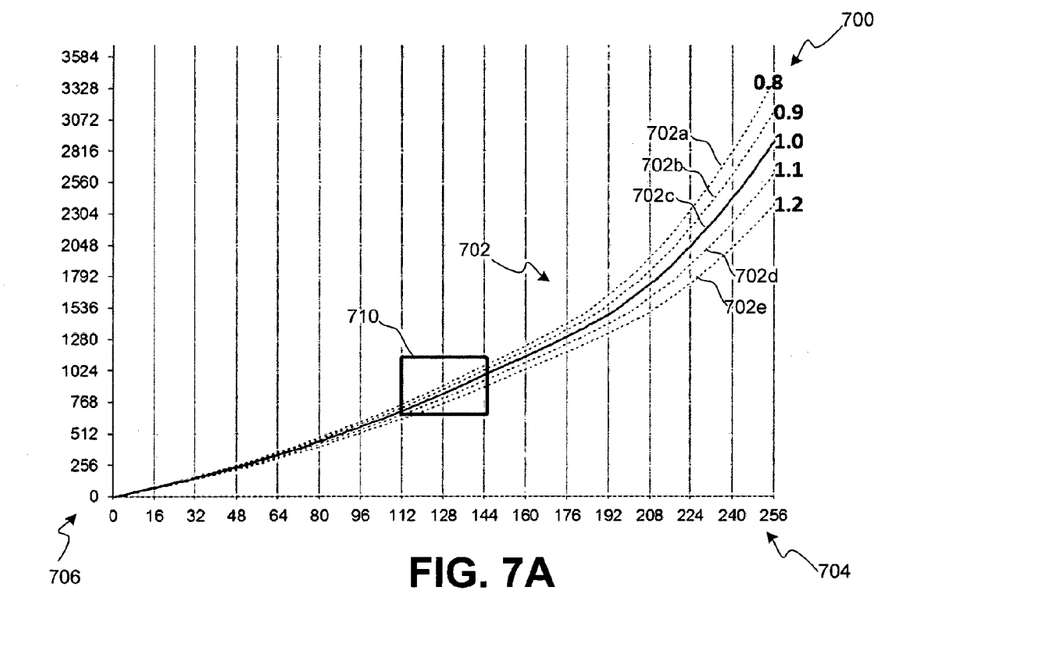
FIG. 7A is a graph illustrating a set of predefined linearizations according to examples.

FIG. 7A illustrates an example of a set 702 of predefined linearizations 702a-702e. Each linearization 702a-702e indicates the number of ink drops required (indicated in ordinate axis 706 as a drop output of twelve bits) for a specific color input associated with a colorimetric parameter (indicated in the abscissa axis 704). In this specific example, the colorimetric magnitude used for the linearization is an eight bit measurement of $L^*$.

Each of linearizations 702a-702e is associated with a specific drop weight as indicated by the drop weight ratios indicated on the right of linearization graph 700. (Linearization 702c corresponds to a nominal drop weight value.) The drop weight ratios are with respect to a nominal drop weight, which is associated with linearization 702c. Linearization 702a is associated with a drop weight ratio of 0.8; linearization 702b is associated with a drop weight ratio of 0.9; linearization 702d is associated with a drop weight ratio of 1.1; linearization 702e is associated with a drop weight ratio of 1.2.

Figure 7B:
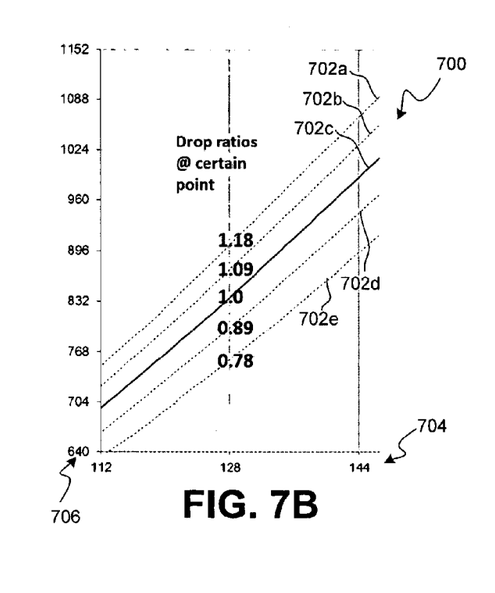
FIG. 7B is a close-up of the graph in FIG. 7A.

Further, for a selected color input each of the linearizations is associated, at a certain point (i.e., at a certain drop number), with a specific drop number ratio with respect to the nominal value. These drop number ratios for a color input value equal to 128 are illustrated in the close-up of rectangle 710, which is shown in FIG. 7B. At an input value equal to 128: linearization 702a is associated with a drop number ratio of 1.18; linearization 702b is associated with a drop number ratio of 1.09; linearization 702c is associated with a drop number ratio of 1 (this is the nominal linearization); linearization 702d is associated with a drop number ratio of 0.89; linearization 702e is associated with a drop number ratio of 0.78.

In order to perform interpolation, two pre-defined linearizations may be selected. The two pre-defined linearizations may correspond to those closer to the drop weight ratios determined from the determined ink drop number variation.

Figure 8:
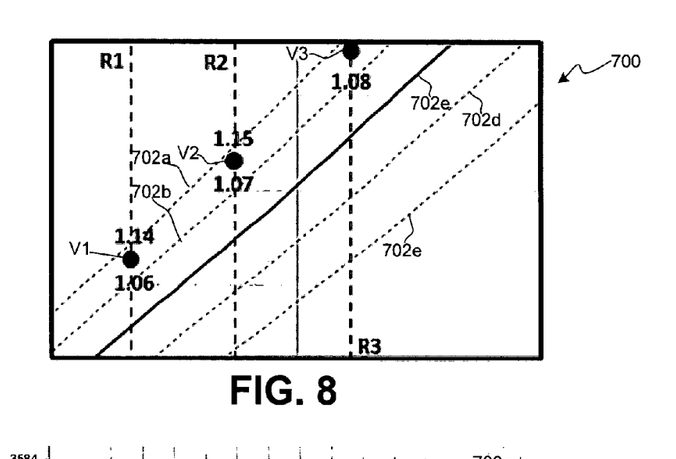
FIG. 8 is a graph illustrating selection of pre-built linearizations for interpolation of according to examples.

For example, looking at FIG. 8, calibration points V1 to V3 may be drawn in linearization graph 700 using the drop ratios values in Table 1. The drop ratios associated to each of linearizations 702a-702e at the corresponding number of drops are used to determine the positions of calibration points V1 to V3 in graph 700. The relative positions of V1 to V3 between corresponding drop ratios may be then used to determine the drop weight ratios which indicate the two linearization curves that are more appropriate for interpolation.

Once two pre-defined linearizations are selected, interpolation may be performed based on the two selected curves. There are a variety of methods to perform the interpolations. For example, an interpolation may be based on the selected curves and the drawn calibration points V1 to V3 in FIG. 8. In other examples, it might be computationally advantageous to derive an actual average drop weight ratio and use this averaged drop weight ratio to interpolate the selected curves. This is illustrated in the following.

An average drop weight ratio can be derived from the drop weight ratios estimated in graph 700 of FIG. 8. More specifically, the relative position of drawn calibration points V1 to V3 with respect to the adjacent predefined linearizations 702a-702e can be used to estimate a drop weight ratio associated to each of the calibration points.

In the example illustrated in FIG. 8, drop weight ratios are computed by linear interpolation of the two pre-built linearizations adjacent to a reference. Each pre-built linearization corresponds to a single drop weight ratio. For example linearization 702a is for a 0.8 drop weight ratio and linearization 702b is for a 0.9 a drop weight ratio. In addition thereto, for each reference point, predefined linearizations can be indexed by number of drops ratios at the drop number of the reference point. For example, as shown in FIG. 8, considering R2, linearization 702a corresponds to a drop number ratio of 1.15 and linearization 702b corresponds to a drop number of 1.07. For each calibration point, by comparing drop number ratios of adjacent linearizations, drop weight ratios can be linearly interpolated. For example, considering calibration point V2, drop number ratios of 1.15 and 1.07 are used to linearly interpolate between drop weight ratios of 0.8 and 0.9. Thereby, a drop weight ratio can be obtained for each of the reference points with an associated drop number ratio in Table 1 above. For the example in FIG. 8, the following drop weight ratios are obtained for each of the references:

TABLE 2

| REFERENCE | R1 | R2 | R3 | R4 | R5 |
|---|---|---|---|---|---|
| DROP WEIGHT RATIO | 0.85 | 0.85 | 0.84 | NA | NA |

Figure 9:
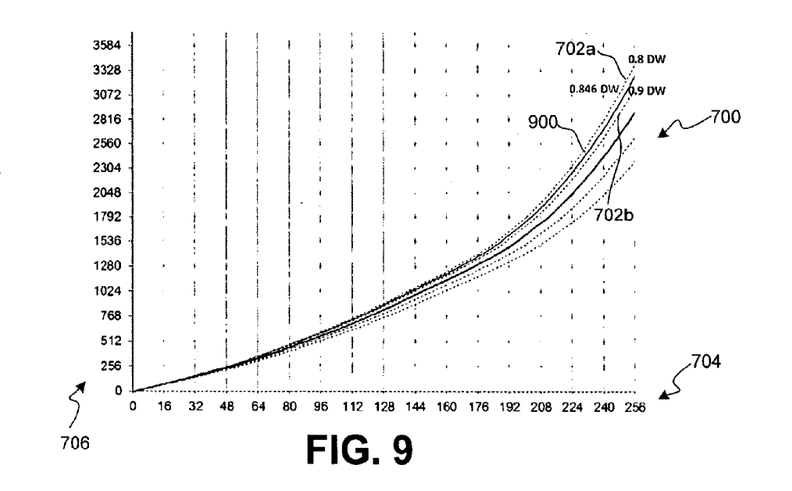
FIG. 9 is a graph illustrating interpolation of linearizations according to examples.

The actual average drop weight ratio may be then derived from these drop weight ratios. In the illustrated example, the actual average drop weight ratio is 0.8466. From this value drop weight ratio and the selected linearizations, an interpolated linearization 900 can be obtained as illustrated in FIG. 9. In the illustrated example, a linear interpolation is applied between adjacent linearizations 702a and 702b by applying a constant interpolation (based on the actual average drop weight ratio) at each point. It will be understood that there are other options for performing the interpolation. For example, drop weight ratio variations over different drop numbers may be taken into account to locally interpolate the adjacent pre-built linearizations.

Referring back to FIG. 5, at block 508, a linearization based on the interpolation may be generated. For example, using the interpolated curve, a look-up table for linearization may be built. The specific format of the linearization look-up table depends on the particular specifications of the used printing system.

CONCLUSIONS

In at least some of the examples above, techniques related to operation of printing systems are illustrated.

It will be appreciated that examples above can be realized in the form of hardware, programming or a combination of hardware and the software engine. Any such software engine, which includes machine-readable instructions, may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of a tangible computer-readable storage medium that are suitable for storing a program or programs that, when executed, for example by a processor, implement embodiments. Accordingly, embodiments provide a program comprising code for implementing a system or method as claimed in any preceding claim and a tangible or intangible computer readable storage medium storing such a program. A tangible computer-readable storage medium is a tangible article of manufacture that stores data. (It is noted that a transient electric or electromagnetic signal does not fit within the former definition of a tangible computer-readable storage medium.)

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Further, flow charts herein illustrate specific block orders; however, it will be understood that the order of execution may differ from that which is depicted. For example, the order of execution of two or more blocks may be scrambled relative to the order shown. Also, two or more blocks shown in succession may be executed concurrently or with partial concurrence. Further, claims reciting "a" or "an" with respect to a particular element contemplate incorporation of one or more such elements, neither requiring nor excluding two or more such elements. Further, at least the terms "include" and "comprise" are used as open-ended transitions.

What is claimed is:

1. A method for calibrating a printer, the printer being for printing an image by deposition of an ink on a substrate, the method comprising:
   performing an actual measurement of a colorimetric parameter by measuring the colorimetric parameter on a printed calibration pattern, the colorimetric parameter being associated with an ink drop number, the calibration pattern being printed with selected printing conditions;
   determining an ink drop number variation from a reference measurement and the actual measurement of the colorimetric parameter, the reference measurement being a measurement of a colorimetric parameter, the reference measurement corresponding to a measurement of the colorimetric parameter on a calibration pattern printed with the selected printing conditions; and
   generating an actual linearization by validating a set of pre-defined linearizations with the determined ink drop number variation.

2. The method of claim 1, wherein the selected print condition includes a number of ink drops of a selected color printable by the printer to print a color patch of the calibration pattern.

3. The method of claim 1, wherein determining the ink drop number variation includes determining an ink drop number ratio from the reference measurement and the actual measurement.

4. The method of claim 1, wherein validating the set of pre-defined linearizations with the determined ink drop number variation includes interpolating two pre-defined linearizations selected based on the determined ink drop number variation, the interpolated pre-defined linearization corresponding to the actual linearization.

5. The method of claim 4, wherein each of the pre-defined linearizations is associated with an ink drop weight, the validating including determining a drop weight ratio associated with the determined ink drop number variation, the drop weight ratio being used to select two pre-defined linearizations associated with the determined ink drop number variation.

6. The method of claim 1, wherein
   the calibration pattern comprises a plurality of color patches, each color patch associated with a number of ink drops,
   the reference measurement and the actual measurement are comprised of a plurality of measurement values, each measurement value being measured from one of the color patches, estimating an actual linearization including averaging using the plurality of measurement values for selecting pre-defined linearizations from the set of pre-defined linearizations.

7. The method of claim 1, wherein the colorimetric parameter is one of L*, a*, b*, Chroma, optical density, or a combination thereof.

8. A computer software product comprising a tangible medium readable by a processor, the medium having stored thereon a set of instructions for operating a printer, the printer being for printing an image by deposition of an ink on a substrate, the instructions comprising:

a set of instructions which, when loaded into a memory and executed by the processor, causes performing a reference measurement of a colorimetric parameter associated with an ink drop number, the colorimetric parameter value corresponding to a measurement of a first calibration pattern comprised of a first set of color patches, each patch being printed using a selected number of ink drops;

a set of instructions which, when loaded into a memory and executed by the processor, causes performing an actual measurement of the colorimetric parameter by printing and measuring a second calibration pattern comprised of a second set of color patches, each patch being printed using the selected number of ink drops; and a set of instructions which, when loaded into a memory and executed by the processor, causes determining compensation data using the reference measurement and the actual measurement, wherein the compensation data is determined to reproduce the first calibration pattern.

9. The product of claim 8, wherein the reference measurement is comprised of a plurality of reference values, the actual measurement is comprised of a plurality of actual values, and the determining of compensation data is based on an ink drop number variation comprised of multiple values derived from the reference measurement and the actual measurement of the colorimetric parameter.

10. The product of claim 9, wherein the ink drop number variation is a set of drop number ratios determined from the actual measurement values and the reference measurement values.

11. The product of claim 8, wherein determining compensation data includes determining an actual linearization of the printer from a set of pre-defined linearizations using the reference measurement and the actual measurement.

12. The product of claim 11, wherein determining the actual linearization includes selecting and interpolating two of the pre-defined linearization from the set of pre-defined linearizations using the reference measurement and the actual measurement.

13. An inkjet printer for printing a pattern by deposition of an ink on a substrate, the printer comprising:

a sensor for measuring a colorimetric parameter associated with an ink drop number;

a controller to:

perform a reference measurement of the colorimetric parameter by printing and measuring via the sensor a first calibration pattern comprised of a set of color patches, each patch being printed using a selected number of ink drops;

perform a measurement of an actual value of the colorimetric parameter by printing and measuring via the sensor a second calibration pattern comprised of the set of color patches, each patch being printed using the selected number of ink drops;

determine a drop number ratio from the actual measurement and the reference measurement; and select two pre-defined linearizations using the determined drop number ratio; and generate an actual linearization of the printer by interpolating the two pre-defined linearizations using the determined drop number ratio.

14. The printer of claim 13, wherein the pre-defined linearizations are associated with the specific type of the substrate.

15. The printer of claim 13, wherein the pre-defined linearizations are selected from a set of pre-defined linearizations built based on, at least, a) an expected drop weight degradation of the printer, b) a manufacturing tolerance of the printer, c) a substrate type, d) an ink type, or a combination thereof.

* * * * *